United States Patent [19]

Dupoy et al.

[11] Patent Number: 4,818,871
[45] Date of Patent: Apr. 4, 1989

[54] PROCESS FOR THE DETECTION OF SUPERIMPOSED SHEETS, APPARATUS FOR PERFORMING THE PROCESS AND APPLICATION TO BANK NOTES

[75] Inventors: Marc Dupoy, Paris; Patrice Dumesnil, GIF sur Yvette; Jacques Mongault, Paris; Camille Carisey, Creteil, all of France

[73] Assignees: Commissariat a L'Energie Atomique; Bull S.A., both of Paris, France

[21] Appl. No.: 51,330

[22] Filed: May 19, 1987

[30] Foreign Application Priority Data

May 30, 1986 [FR]  France ................... 86 07807

[51] Int. Cl.⁴ .............................................. G01N 23/16
[52] U.S. Cl. .................................. 250/308; 250/358.1; 250/360.1; 209/534
[58] Field of Search ................. 250/308, 358.1, 359.1, 250/360.1, 339; 283/94; 209/534; 356/71

[56] References Cited

U.S. PATENT DOCUMENTS

| | | | |
|---|---|---|---|
| 3,518,431 | 6/1970 | Rowe | 250/308 |
| 3,742,216 | 6/1973 | Hahn | 250/308 |
| 3,795,395 | 3/1974 | Ransom et al. | 271/4 |
| 3,889,121 | 6/1975 | Bossen | 250/308 |
| 3,938,663 | 2/1976 | Carnes et al. | 356/71 |
| 4,179,031 | 12/1979 | Ward | 209/534 |
| 4,331,241 | 5/1982 | Smirin | 250/252.1 R |
| 4,623,975 | 11/1986 | Kagami | 209/534 |
| 4,682,768 | 7/1987 | Iida et al. | 209/534 |

FOREIGN PATENT DOCUMENTS

83/02513 7/1983 PCT Int'l Appl. .
2106081 4/1983 United Kingdom .

Primary Examiner—Janice A. Howell
Assistant Examiner—William F. Rauchholz
Attorney, Agent, or Firm—Oblon, Fisher, Spivak, McClelland & Maier

[57] ABSTRACT

The present invention relates to a process for the detection of superimposed sheets, the apparatus making it possible to perform this process and the application thereof to bank notes. The process for detecting superimposed sheets by evaluating their surface mass is characterized in that it comprises the stages of passing the sheets oriented in the direction of their width between a beta particle source and a Geiger-Müller counter, counting the number of particles received by the counter by measuring the frequency $F_g$ of the pulses from the Geiger counter to determine the surface mass and eliminating the notes having a high superimposition level by comparison with a limit value.

10 Claims, 2 Drawing Sheets

PROCESS FOR THE DETECTION OF SUPERIMPOSED SHEETS, APPARATUS FOR PERFORMING THE PROCESS AND APPLICATION TO BANK NOTES

BACKGROUND OF THE INVENTION

The present invention relates to a process for the detection of superimposed sheets, to the apparatus making it possible to perform the process and the application, in exemplified manner, to the examination of bundles of bank notes.

At present, apparatuses for detecting the superimposition of sheets are known, particularly in the banking field for detecting double bank notes. These apparatuses are based on the principle of mechanical detection by a roller, which senses the thickness of the notes travelling in the longitudinal direction on a drive roller. This type of apparatus causes problems of concentricity of the sensing roller and the drive roller and in addition only permits limited movement speeds, even in the case where the notes are fed in the direction of their greatest length.

Thus, the first objective of the present invention is to obviate the disadvantages of the prior art and to propose a process for the detection of superimposed sheets making it possible to partly or totally eliminate superimposed sheets from the sheets transported in the direction of their width.

SUMMARY OF THE INVENTION

This object is achieved by the fact that the process for the detection of superimposed sheets by the evaluation of their surface mass comprises the stages of passing the sheets between a particle source and a particle detector, counting the number of particles received by the detector by measuring the frequencies of the pulses of the detector in order to determine the surface mass and eliminating the notes with a high level of superimposition by comparing the count frequency with a limit value. In summarizing, the count frequency drop due to the presence of an increased thickness is determined.

The first aforementioned object must be achieved even when the sheets are travelling at high speed, such as one or two meters per second.

To this end and according to another feature, the comparison with a limiting frequency value of the pulses of the particle detector is obtained by discrimination between the frequency of the pulses of the detector and the frequency of the pulses of a given frequency oscillator FO.

Another object of the invention is to propose a process making it possible to eliminate double sheets, whose superimposition level is small.

This second object is achieved by the fact that measurement takes place of the width of the sheets by means of a coding wheel associated with the transportation system, the coding wheel supplying a number of pulses proportional to the rotation during the sheet passage time, these pulses decrementing a preloaded subtract counter to a mean value representing a normal width of a single sheet, the elimination order corresponding to the passage through a threshold of the subtract counter content.

A third object is to propose a process making it possible to eliminate excessively short sheets (e.g. a sheet folded back on itself).

This third object is achieved in that a logic circuit connected to the outputs of the subtract counter emits an elimination order if, at the time when the signal from the sheet presence detection circuit disappears, the content of said subtract counter has still not reached a given minimum value.

Another object of the invention is to propose an apparatus making it possible to perform the process.

This object is achieved by the fact that the apparatus comprises a beta particle source and a Geiger-Müller counter arranged on either side of a sheet transport path, an adding counter validated by the pulses of the geiger counter and controlled by an oscillator supplying a frequency signal FO, the overflow output of the adding counter supplying a signal indicating, in the case of an overflow, a high level of superimposition of the sheets, a coding wheel associated with the device for transporting the sheets along the path, the pulses of the coding wheel decrementing a subtract counter preloading to a mean value representing the normal width of the sheet, a circuit for detecting the presence of a sheet and logic circuit taking account of the output signals of the sheet presence detection circuit from the adding counter/subtract counter, in order to bring about or not the elimination of the sheets by the motor member of a switching means located in the transport path downstream of the beta source and the Geiger counter with respect to the sheet displacement direction.

According to another feature, the apparatus comprises in series on the output of a high voltage supply circuit of the Geiger counter, a very high resistance for eliminating the intensity of the peak current supplied by the Geiger counter.

According to another feature, the apparatus comprises in series between the output of the high voltage supply circuit and the high resistance, a second very high resistance for increasing the dead time of the Geiger counter with a view to limiting the counting rate in the absence of sheets. This makes it possible to increase the life of the Geiger counter.

A final object of the invention is its use for the detection of bank notes.

This object is achieved by the fact that the apparatus and the process are applied to bank notes.

BRIEF DESCRIPTION OF THE DRAWINGS

The invention is described in greater detail hereinafter relative to non-limitative embodiments and the attached drawings, wherein show:

FIG. 1 shows a sheet F moving in its width direction, indicated by arrow A, on a not shown transportation or conveying means, which can in per se known manner be constituted by a system of rollers and belts. Sheet F is interposed between a Geiger-Müller counter (GM) and a beta particle source (C), e.g. constituted by carbon 14. Counter (GM) is supplied or energised by a high voltage supply source (3), whose output is connected by two resistors in series (R3, R4) to the anode of counter (GM). The common point B to the two resistors (R3, R4) is connected by a capacitor c2 to a circuit (4) for shaping the pulses of counter (GM). The output signal of shaping circuit (4) constituted by mean frequency pulses $F_G$ representative of the number of beta electrons reaching the counter in a given time is supplied to an input (601) of a frequency discriminator circuit (6), whereof a second input (600) receives the output of an oscillator circuit (5) supplying a frequency signal $F_o$, which can be regulated in known manner by a potentiometer (P1, FIG. 2). Output (610) of discriminator (6) is supplied to an OR gate (80), whose output controls a type D flip-flop (8) which, when armed by the output of circuit (80), brings about the supply or energization of a coil (9) constituting the motor of a switching system located in the sheet transportation device on the path of the sheets downstream of counter (GM) and source C, so as to switch the sheets either towards a not shown recovery box, or towards the distribution output. This flip-flop (8) is disarmed at the end of the passage of a sheet by a circuit indicating the presence or absence of a sheet constituted by a photoreception diode (D2) connected to the input of a circuit (2) for shaping the signal of diode (D2). The output of circuit (2) is connected on the one hand to the disarming input (81) of flip-flop (8) and on the other, following inversion, to the input (71) of a logic circuit (7) making it possible to determine the documents having a width which is either too short, or too long compared with a mean value. On its clock input H (710), circuit (7) receives the output signal from a circuit (10) for shaping pulses supplied by a photoreceiver (D1) placed on one side of a coding wheel (11) having slots permitting the illumination of photoreceiver (D1). In known manner, coding wheel (11) is integral with drive rollers of the sheet transportation device and supplies pulses, whose number is proportional to the distance covered by a sheet. The signal supplied by the output of discriminator circuit (6) to circuit (80) indicates the sheets exceeding a certain thickness. The output of circuit (80) which arms flip-flop (8) consequently makes it possible to eliminate from the transportation device the sheets having a too great or too small a width or whose thickness is excessive. For example, this apparatus can be used for detecting double bank notes.

The detection principle is as follows. The source emits beta electrons, which are counted by counter (GM) and its associated circuit, so as to determine the number of electrons reaching the counter in a given time. The interposing of a sheet or note thickness between the source and the detector leads to a count reduction of approximately 40%. The interposing of two sheet or note thicknesses leads to an even greater count drop of approximately 80% compared with a single thickness. These relatively large count contrasts make it possible to detect increased thicknesses in accordance with a procedure consisting of rejecting all objects during whose passage the number of strokes obtained is below a given threshold. The reaction speed of counter (GM) makes it possible to check the sheets or notes travelling in the direction of their width (approximately 8 cm) at a speed of one to two m/s. This principle operates effectively for the detection of sheets with a high overlap level, whilst the detection of double sheets having a limited overlap level is difficult due to the very short time given for carrying out this measurement. To overcome this difficulty, use is made of a frequency discriminator, which also makes the system relatively insensitive to the value of the passage speed of the notes. In order to detect very limited overlaps, measurement takes place of the width of each object with the aid of the coding wheel associated with photoelectric cells. All objects having a width exceeding that of a standard sheet or note are eliminated. Thus, notes having a limited superimposition level are very easily detected by the measurement of their width and completely superimposed notes are detected by the reduction in the count which they cause.

The detection of double notes only takes place by one of the two possible methods in the extreme cases of very limited or almost total overlap. In intermediate cases, the two methods function simultaneously.

Figure 1:
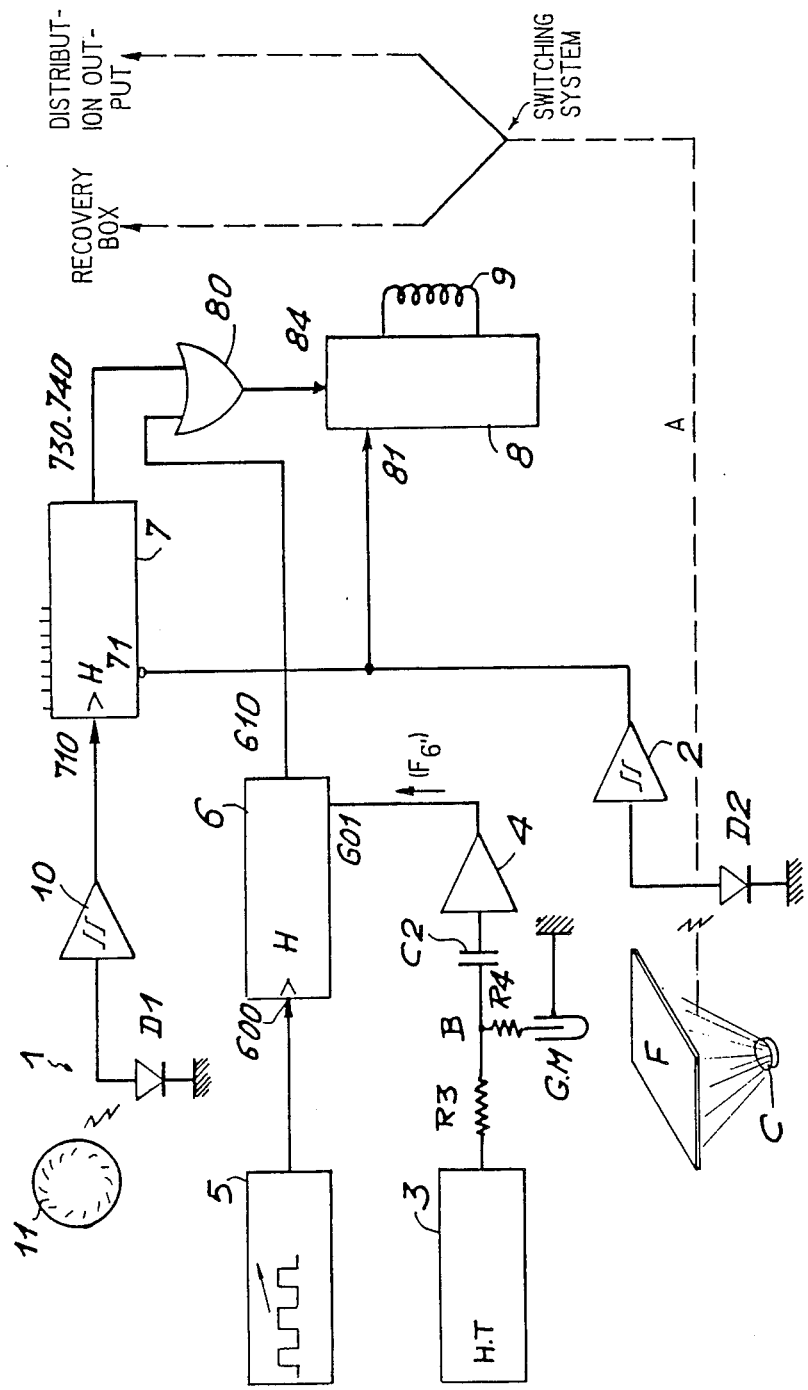
FIG. 1, a diagrammatic view of the apparatus permitting the performance of the process.
Figure 2:
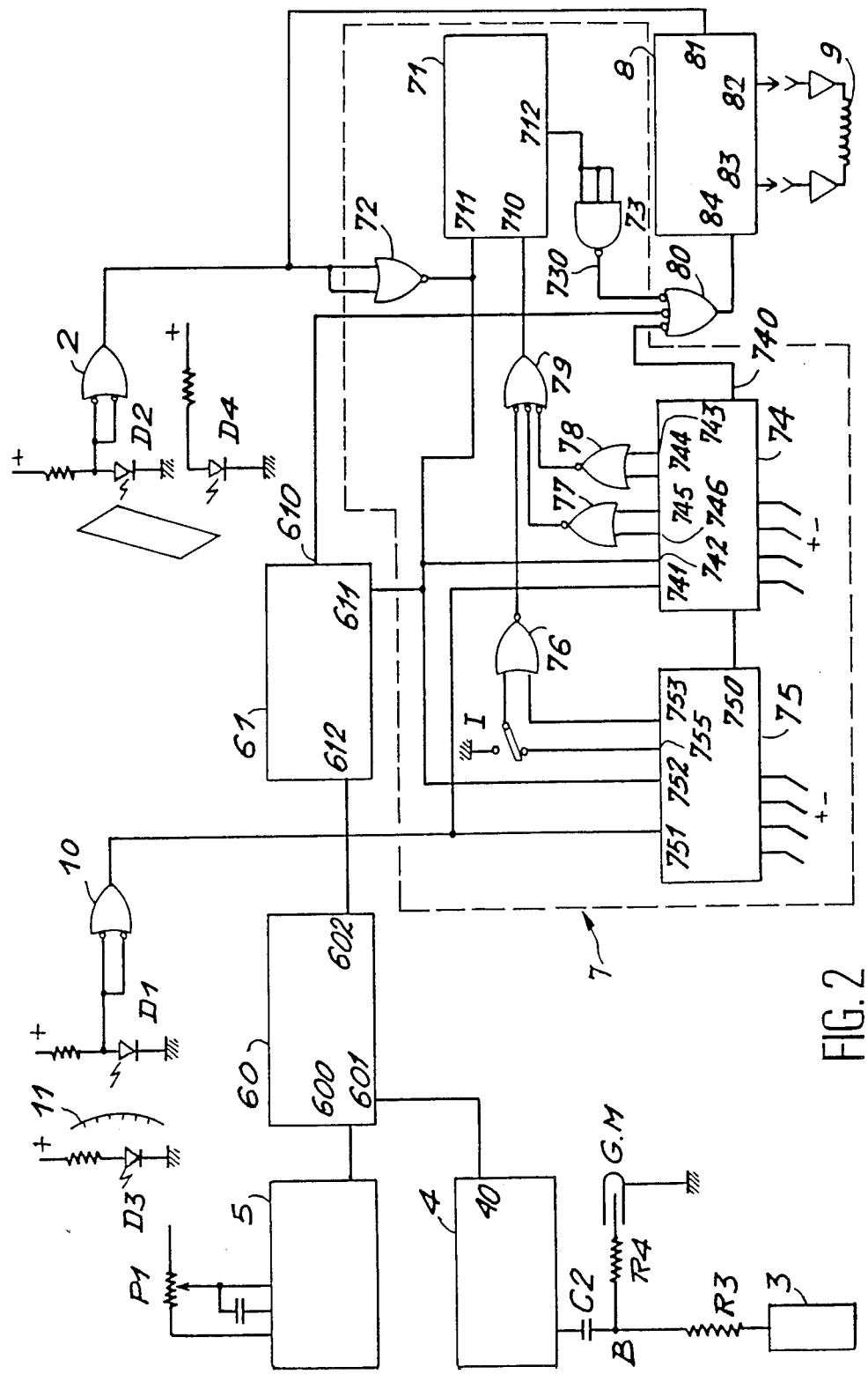
FIG. 2, the diagram of the electronic circuits of the apparatus according to the invention.

FIG. 2 shows the general diagram of electronic circuits, in which the circuit for detecting the presence or absence of sheets is constituted by a light-emitting diode (D4) energized in per se known manner and whose light is reflected by the presence of a sheet in the direction of a photoreception diode (D2), connected in known manner via a resistor to a power supply. The signal taken between the photoreception diode (D2) and the resistor is passed to a Schmitt trigger (2) for shaping the pulses. The output of the Schmitt trigger (2) is connected on the one hand to the input of an inverting gate (72) and on the other to the validation input (81) of a flip-flop (8), whose control input (84) receives the output of an OR circuit (80). The output of the OR circuit (80) represents the informations corresponding to the three possible eventualities, i.e. excessively thick sheet, too long sheet, too short sheet. In one of these three following cases the OR output (80) controls by input (84) flip-flop (8), whose outputs (82, 83) are connected to the coil (9) of a motor for controlling the elimination switching of excessively thick, excessively long or excessively short sheets. Control (84) consequently brings about at the terminals of coil (9) a polarity reversal ensuring the necessary switching. The element for detecting the presence of a sheet is positioned perpendicular of the Geiger counter (GM) and makes it possible to indicate by a positive square wave pulse, at the output of circuit (2), the presence of a bank note. The leading wave of this pulse validates flip-flop (8) by input (81). The signals corresponding to the excessively long and excessively short sheet informations are respectively supplied by the outputs (740, 730) of a length checking circuit (7). The said circuit comprises a coding wheel (11) integral in rotation with the sheet transporting device and whose slots are illuminated from one side by a light-emitting diode (D3) energized in per se known manner across a resistor by a power supply. A photoreception diode (D1), also energized across a resistor by a power supply, supplies the pulses representative of the displacement to a Schmitt trigger (10) ensuring the shaping of the signals. The output of circuit (10) is connected on the one hand to the clock input (751) of a first subtract counter (75) and on the other hand to the clock input (741) of a second subtract counter (74). These two subtract counters are preloaded to a given value by cabling on reception of the signal supplied by the output of inverter (72), which is connected on the one hand to the input (752) for validating the loading of the first subtract counter (75) and on the other to the validation input (742) of the loading of the second subtract counter (74). Thus, these two subtract counters are preloaded during the absence of bank notes by the signal from the output of inverter (72) and decremented by each of the pulses supplied by the coding wheel (11) and photodiode (D1). The preloading of the subtract counters takes place to a value corresponding to the normal width of a sheet. During the passage of an excessively long note, the content of the subtract counters passes through 0 and brings about on the series outputs (750, 740) the emission of a hold-back pulse, which will trigger the ejection device (8, 9). The excessively short sheets are detected by the following circuit, which is constituted by a NOR gate (76) with two inputs, which are connected to the bits of significance 1 and 2 constituted by the outputs (753, 755) of subtract counter (75). The output of NOR gate (76) is connected to one of the inputs of a NAND gate (79) having three inputs. The two other inputs of gate (79) receive the outputs of the two NOR gates with two inputs (77, 78). The inputs of the NOR gate (78) are connected to the outputs (744, 743) respectively corresponding to the bits of significance 0 and 1 of subtract counter (74). The inputs of NOR gate (77) are connected to outputs (745, 746) respectively corresponding to the bits of significance 2 and 3 of subtract counter (74). A switch (I) makes it possible to select the width tolerance window of the sheets. When in the position indicated in FIG. 2, switch (I) selects a window width corresponding to 7 pulses of the coding wheel. As output (755) corresponds to bits of significance 2 and output (753) to bits of significance 1, which corresponds to the binary code of number 6, at the 7 th pulse output (755, 753) are at 0 and consequently the output of circuit (76) is at 1. In the same way, the outputs of circuits (78, 77) are at 1 when subtract counter (74) passes through 0. In all other cases at least one of the outputs of circuits (76, 77, 78) is at level 1 and consequently the output of NAND gate (79) is at 1. When the width of the notes remains in the window selected by the position of switch (I), the output of circuit (79) remains at 0. As soon as the width of a sheet either exceeds, or drops below the window, the output of circuit (79) passes to level 1. The output of circuit (79) is supplied to the clock input (710) of a flip-flop (71), which receives at its validation input (711) the output signal from inverter (72) indicating the presence of sheets. As the flip-flop (71) is validated by the sheet presence signal, its output Q (712) changes level when the output of circuit (79) changes level. Output signal (712) is supplied via an inverter (73) to the OR circuit (80) for the control of the ejection flip-flop (8). This signal (730) supplied by inverter (73) indicates sheets with an inadequate width. When switch (I) is connected to ground instead of being connected to the output (755) of subtract counter (75), the width tolerance window of the sheets in this case corresponds to 3 pulses of the coding wheel. The output signal (610), which indicates the thickness of the sheets, is generated in the following way. Counter (GM) is energized by a high voltage power supply across a 22M $\Omega$ resistor (R3) and a 1M $\Omega$ resistor (R4). The common point (B) of these two resistors is connected by a capacitor (C2) a circuit (4) for shaping the pulses supplied by counter (GM) during the reception of beta particles. The shaping output (4) is constituted by a relooped D-type bistable flip-flop. The output (40) of circuit (4) is connected to the validation input (601) of a counter (60). The clock input (600) of counter (60) is connected to an oscillator (5), whose frequency $F_o$ can be regulated by means of a potentiometer (P1). Counter (60) is of capacity k with k=16. Oscillator (5) of frequency $F_o$ permanently increments counter (60). The output of circuit (4) emits pulses at a frequency $F_g$ corresponding to the frequency of the particles received by counter (GM). When this frequency $F_g$ is below k.F (the dot indicating a multiplication)$_o$, adding counter (60) overflows and a pulse adding counter (60) overflows and a pulse is emitted to the overflow output (602) of the counter. This output (602) is connected to the input (612) of a divider by 2 (61), whose validation input (611) is connected to the output of inverter (72). The output (610) of this divider by 2 is connected to circuit (80) and the signal from said output indicates excessively thick sheets. The pulses transmitted by output (602) and circuit (80) bring about the switching of ejection device (8, 9). In the presence of a single sheet thickness, the frequency $F_g$ of the pulses of Geiger counter (GM) is sufficiently high to prevent any overflow of adding counter (60) and the sheet continues its normal path. The divider by 2 (61) only emits a rejection instruction at its output (610) after having received two successive overflow pulses at its input (612). This makes it possible to avoid bringing about the rejection of single sheets as a result of a random overflow pulse brought about by statistical fluctuations of the emission of particles by the carbon-14 source (C). It is finally pointed out that one M $\Omega$ resistor (R4) makes it possible to limit the intensity of the peak current supplied by the Geiger counter (GM) and the very high resistance (R3) makes it possible to increase the dead time between the pulses supplied by the Geiger counter by increasing the times constant of the system constituted by the Geiger counter and capacitor (C2). This arrangement makes it possible to limit the count level of the particles, which must be very high when there are no bank notes present. This arrangement makes it possible to considerably extend the life of the Geiger counter.

It is obvious that other modifications falling within the scope of the Expert also fall within the scope of the invention. Thus, a simpler method consisting of measuring the count rate during the passage of the sheet and following its evolution also forms part of the invention. However, bearing in mind the measuring conditions imposed, i.e. bank note passage speed of 2 m/s with a minimum sheet overlap of approximately 3 cm, the useful measuring time is no more than 15 ms. Moreover, the counts observed are relatively low due to the characteristics of the nuclear part of the apparatus (nature and fluence of the source, sensitivity of the Geiger counter). With one paper thickness, approximately 1800 strokes are counted, whereas with two thicknesses there are 350 strokes per second. The number of strokes acquired in 15 ms would be 27 and 5 respectively. Finally, to ensure a negligible significance of straddled zones (on the single sheet and the double sheet), the count must be broken down into very precise times of e.g. 1 ms. Although this method is possible, it would require the use of a specific microprocessor for controlling the acquisition of said data and the subsequent processing thereof, so that the overall apparatus would be relatively complex.

The result of the single sheet and double sheet measurement would only be known at the end of a certain time necessary for carrying out the calculation and following on to the passage of the object to be checked.

This reveals the interest of the preferred method according to the invention, which comprises using a counter (60) to serve as a frequency discriminator, so that the measurement becomes effective as soon as the increased thickness is interposed between the source and the detector and the measurement processing acquisition is carried out on an overall basis in real time.

The Geiger-Müller counter was essentially chosen for price reasons. It is also possible to use other detectors (germanium, silicon or mercuric iodide) without prejudicing the measuring principle.

What is claimed is:

1. A process for the detection of superimposed sheets by evaluating their surface mass, comprising the steps of:

passing sheets oriented in a given direction on a transporting system between a particle source and a particle detector, counting the number of particles received by the detector by measuring the frequency $F_g$ of the pulses of the detector in order to determine the surface mass, and eliminating the sheets with a high superimposition level by comparing the count frequency with a limit value.

2. A process according to claim 1, wherein the comparison with a limit value of the frequency $F_g$ of the pulses from the detector is obtained by discrimination between the frequency $F_g$ of the pulses from the detector and the frequency $F_o$ of the pulses from an oscillator.

3. A process according to claim 2, wherein the discrimination is carried out by detection of the overflow of a counter, whose validation input receives the frequency $F_g$ from the Geiger counter and the clock input receives the frequency $F_o$ from the oscillator.

4. A process according to claim 1, further comprising the step of elimination of double sheets with a limited superimposition level by measuring the width thereof by means of a coding wheel associated with the transporting system and supplying a number of pulses proportional to the rotation of the coding wheel during the sheet passage time in order to decrement a subtract counter preloaded to a mean value representative of the normal width of the single sheet, the elimination order corresponding to the passage through a threshold of the subtract counter content.

5. A process according to claim 4, further comprising the step of elimination of excessively short sheets by a logic counter connected to the output of the subtract counter and emitting an elimination order if, at the time where the signal from a sheet presence detection circuit disappears, the subtract counter content has not yet reached a predetermined minimum value.

6. A process according to claim 1, said process being applied to bank notes.

7. An apparatus for the detection of superimposed sheets, comprising:

a beta particle source and a Geiger-Müller counter arranged on opposite sides of a sheet transportation path, the Geiger counter having a supply circuit, the sheets being oriented in a given direction, an adding counter validated by the pulses from the Geiger counter, the pulses having a frequency which is a function of the surface mass of the sheets and the adding counter being controlled by an oscillator supplying a signal of frequency $F_o$, an overflow output of the counter supplying a signal which is a function of the signal from the oscillator and pulses from the Geiger counter indicating, in the case of an overflow, a high level of superimposition of the sheets, a coding wheel associated with the device for transporting the sheets along the path, the pulses of the coding wheel decrementing a subtract counter preloaded to a mean value representative of a normal sheet width, a circuit for detecting the presence of a sheet and a logic circuit taking account of the output signals from the sheet presence detection circuit, the adding counter and the subtract counter for controlling the elimination of the sheets by a motor element of a switching means located in the transportation path downstream of the beta source and the Geiger counter with respect to the direction that the sheets are being transported.

8. An apparatus according to claim 7, wherein a first resistor is connected in series to the output of the supply circuit of the Geiger counter, in order to limit the intensity of the pulses supplied by the Geiger counter.

9. An apparatus according to claim 8, wherein a second resistor is connected in series between the output of the high voltage supply circuit and the first resistor in order to increase the dead time of the Geiger counter to limit the count rate in the absence of sheets.

10. An apparatus according to claim 7, said apparatus being applied to bank notes.

* * * * *